(12) United States Patent
Miyazawa

(10) Patent No.: US 7,391,477 B2
(45) Date of Patent: Jun. 24, 2008

(54) APPARATUS AND METHOD FOR PROCESSING VIDEO SIGNAL

(75) Inventor: Hirotoshi Miyazawa, Kumagaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 582 days.

(21) Appl. No.: 11/157,911

(22) Filed: Jun. 22, 2005

(65) Prior Publication Data
US 2006/0001775 A1 Jan. 5, 2006

(30) Foreign Application Priority Data
Jun. 30, 2004 (JP) .............................. 2004-194573

(51) Int. Cl.
*H04N 5/21* (2006.01)
*G06K 9/40* (2006.01)

(52) U.S. Cl. ...................... 348/625; 382/266
(58) Field of Classification Search ................ 348/625, 348/627–629; 382/266–269; 345/611
See application file for complete search history.

(56) References Cited

U.S. PATENT DOCUMENTS

| | | | | |
|---|---|---|---|---|
| 4,733,300 A * | 3/1988 | Sugiyama et al. ........... | 348/448 |
| 4,855,829 A | 8/1989 | Kihara | |
| 5,200,824 A * | 4/1993 | Kageyama ................... | 348/607 |
| 5,404,180 A * | 4/1995 | Kitano et al. ................ | 348/625 |
| 5,491,520 A * | 2/1996 | Nozawa et al. .............. | 348/625 |
| 5,606,375 A | 2/1997 | Lee | |
| 5,715,015 A | 2/1998 | Lee | |
| 6,088,065 A * | 7/2000 | Uchida ........................ | 348/625 |
| 6,433,836 B1 | 8/2002 | Suzuki et al. | |
| 6,597,407 B1 | 7/2003 | Taketani et al. | |
| 6,677,994 B1 * | 1/2004 | Kobayashi .................. | 348/252 |
| 2003/0156224 A1 * | 8/2003 | Ishikawa et al. ............ | 348/625 |
| 2006/0133654 A1 * | 6/2006 | Nakanishi et al. .......... | 382/118 |

FOREIGN PATENT DOCUMENTS

JP 11-243496 A 9/1999

OTHER PUBLICATIONS

European Search Report dated Aug. 24, 2005 for Appln. No. 05104628.2-2202.

* cited by examiner

*Primary Examiner*—Victor R Kostak
(74) *Attorney, Agent, or Firm*—Pillsbury Winthrop Shaw Pittman, LLP

(57) ABSTRACT

An amplitude discrimination circuit separates a received video signal into a signal component with a minute amplitude level and other signal component with a high amplitude level. A contour correction circuit performs contour correction processing on a signal with the high amplitude level and a nonlinear processing circuit performs nonlinear processing after adding the signal with high amplitude level to an output from a delay circuit which delays the received video signal by the time required for the contour correction processing performed by the contour correction circuit. A minute amplitude contour correction circuit performs contour correction processing on the signal with the minute amplitude level and an adder circuit adds the signal with the minute amplitude level to an output from the nonlinear processing circuit after delaying the signal with the minute amplitude level by the time required for the nonlinear processing performed by a delay circuit.

14 Claims, 7 Drawing Sheets

APPARATUS AND METHOD FOR PROCESSING VIDEO SIGNAL

CROSS-REFERENCE TO RELATED APPLICATIONS

This application is based upon and claims the benefit of Priority from prior Japanese Patent Application No. 2004-194573, filed Jun. 30, 2004, the entire contents of which are incorporated herein by reference.

BACKGROUND OF THE INVENTION

1. Field of the Invention

The present invention relates to an apparatus and a method for processing a video signal for displaying a video signal onto such as a flat panel type display, and specifically, relates to an improvement in a horizontal contour correction for the apparatus and the method related thereto.

2. Description of the Related Art

In recent years, a flat panel type display using, for example, a liquid crystal panel or a plasma display panel has become widely used. For this kind of display, a video projection type, or so-called projector tends to become widely used.

Incidentally, in such a display apparatus performs contour correction processing to enhance its contour component for an input video signal. A technique to extract a contour component of a brightness signal and vary a contour correction amount in response to its amplitude width is disclosed in Jpn. Pat. Appln. KOKAI Publication No. 11-243496.

However, the technique for performing the contour correction processing to a video signal has not developed perfectly and has been sill in a developing stage, and it is therefore strongly desired for a method further appropriate for practical use to be developed, in respect of a variety of points.

BRIEF SUMMARY OF THE INVENTION

According to an embodiment of the present invention, an apparatus for processing a video signal comprises a receiving unit which receives a broadcast signal, a recovery processing unit which recovers a video signal from the broadcast signal received by the receiving unit, a first contour correction unit which performs contour correction processing on the video signal recovered by the recovery processing unit, a first delay unit which delays the video signal recovered by the recovery processing unit by the time required for the contour correction processing performed by the first contour correction unit, a first adder unit which adds an output signal from the first delay unit to an output signal from the contour correction unit, a nonlinear processing unit which performs nonlinear processing on an output signal from the first adder unit, a separation unit which separates a signal component with not more than a prescribed amplitude level from a contour component of the video signal recovered by the recovery processing unit, a second contour-correction unit which performs contour correction processing on a signal with not more than the prescribed amplitude level separated by the separation unit, a second delay unit which delays an output signal from the second contour correction unit by the time required for the nonlinear processing performed by the nonlinear processing unit, and a second adder unit which adds an output signal form the second delay unit to an output signal from the nonlinear processing unit.

According to an another embodiment of the present invention, a method for processing a video signal comprises a first step of receiving a video signal, a second step of performing contour correction processing on the received video signal, a third step of delaying the signal by the time required for the contour correction processing in the second step, a fourth step of adding an output signal from the third step and an output signal from the second step, a fifth step of performing nonlinear processing on an output signal from the fourth step, a sixth step of separating a signal component with not more than a prescribed amplitude level from a contour component of the video signal received in the first step, an seventh step of performing contour correction processing on a signal with not more than the prescribed amplitude level separated in the sixth step, a eighth step of delaying an output signal from the seventh step by the time required for the nonlinear processing in the fifth step, and a ninth step of adding an output signal from the eighth step to the output signal from the seventh step.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
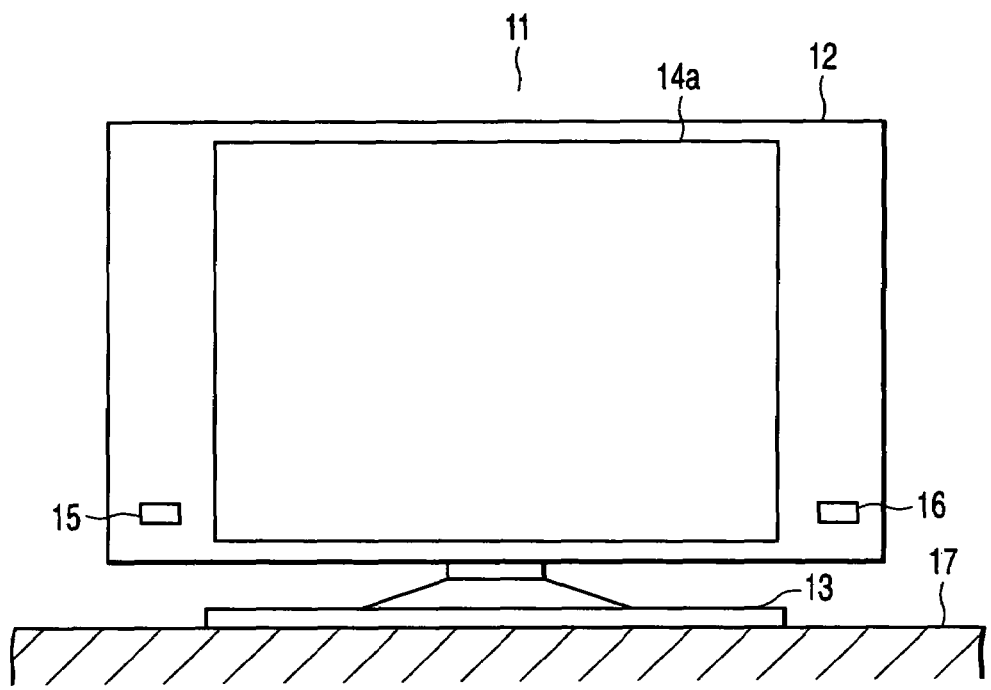
FIG. 1 is a view showing an embodiment of the invention and a front elevation view for explaining an external appearance of a television (TV) receiving apparatus.
Figure 2:
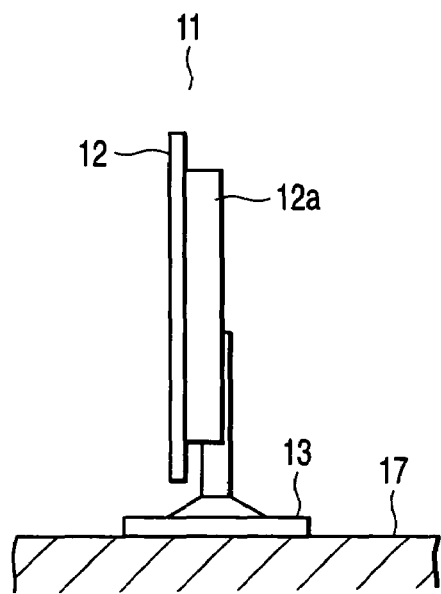
FIG. 2 is a side elevation view for explaining the external appearance of the TV receiving apparatus in the embodiment.

Hereinafter, the details of an embodiment of the present invention will be explained by referring drawings. FIG. 1 and FIG. 2 show a front view and a side view of a TV receiving apparatus 11 of a flat panel type which will be explained in this embodiment, respectively.

The TV receiving apparatus 11 is composed of mainly a cabinet 12, a support base 13 to support the cabinet 12. A front center part of the cabinet 12 is provided with a display panel 14a of a later-mentioned video display unit 14.

On the both sides of the display panel 14a of the cabinet 12 is provided a power switch 15 and a receiving unit 16 for receiving operation information transmitted from a wireless remote controller (not shown). Moreover, a housing unit 12a with a later-mentioned signal processing system housed therein is disposed on the rear side of the cabinet 12.

On the other hand, the support base 13 is rotatably connected to a rear central part of the cabinet 12 and configured to make the cabinet 12 stand rise in a state that the support base 13 is mounted on a horizontal surface of a prescribed base stand 17.

Figure 3:
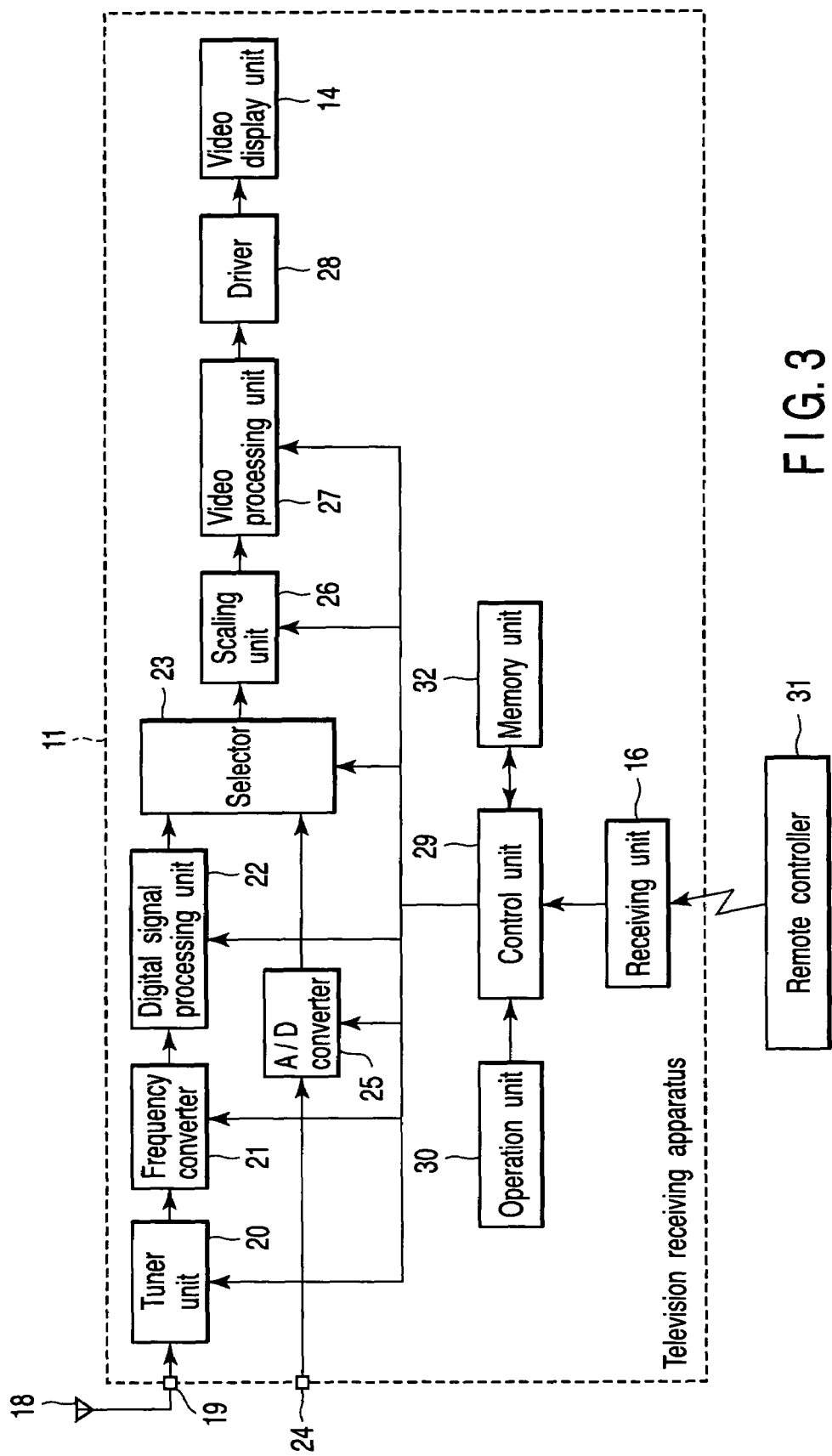
FIG. 3 is a block diagram for explaining a signal processing system of the TV receiving apparatus in the embodiment.

FIG. 3 shows the signal processing system of the TV receiving apparatus 11. That is, a TV broadcast signal received via an antenna 18 is supplied to a channel unit 20 through an input terminal 19 and a broadcast signal of a prescribed channel is tuned.

The broadcast signal output from the tuner unit 20 is supplied to a frequency converter 21 to be converted into an intermediate signal, then, recovered to a digital video signal by means of a digital signal processing unit 22, and supplied to a selector 23.

Meantime, the TV receiving apparatus 11 receives a video signal generated in a component format or an RGB format from an external arbitrary source via an input terminal 24. The video signal supplied to the input terminal 24 is supplied to an analog/digital (A/D) converter 25 to be converted into a digital signal then supplied to the selector 23.

The selector 23 selectively outputs two kinds of video signals to be input, to a scaling unit 26. The scaling unit 26 performs scaling processing of the input video signal so as to match the number of pixels of the input video signal to the number of the pixels of the display panel 14a of the video display unit 14 to output the processed video signal to a video processing unit 27.

The video processing unit 27 performs processing of the input video signal so as to make a video display on the video display unit 14. Then, the video signal output from the video processing unit 27 is supplied to the video display unit 14 via a driver 28 to enable video display.

Here, the whole operation, including a variety of receiving operations described above, of the TV receiving apparatus 11, are controlled by a control unit 29. The control unit 29 incorporates a central processing unit (CPU) (not shown), etc., receives operation information from an operation unit 30 including a power switch 15, or receives operation information transmitted from a remote controller 31 through the receiving unit 16 and respectively controls each unit so that operation contents in the operation information are reflected.

In this case, the control unit 29 utilizes a memory unit 32. The memory unit 32 is composed of mainly a dedicated memory (not shown) with a control program to be executed by a CPU in the control unit 29 stored therein, a read/write memory (not shown) to provide a working area for the CPU, and a nonvolatile memory (not shown) in which a variety of setting information and control information, etc. is stored.

Figure 4:
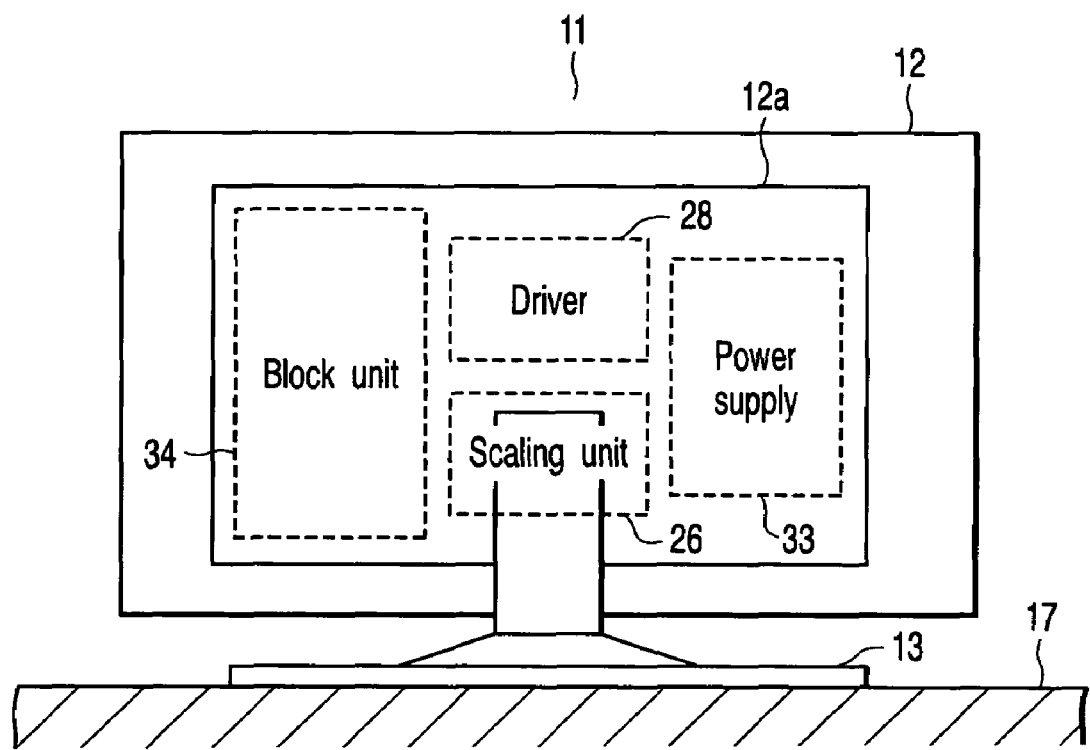
FIG. 4 is a rear elevation view for explaining the appearance of the TV receiving apparatus in the embodiment.

FIG. 4 shows a rear view of the TV receiving apparatus. In the housing unit 12a of the cabinet 12, the driver 28 and the scaling unit 26 are disposed at its center part, a power unit 33 is disposed on the right side in FIG. 4, and a block unit 34 including the other units is disposed on the left side in FIG. 4.

Figure 5:
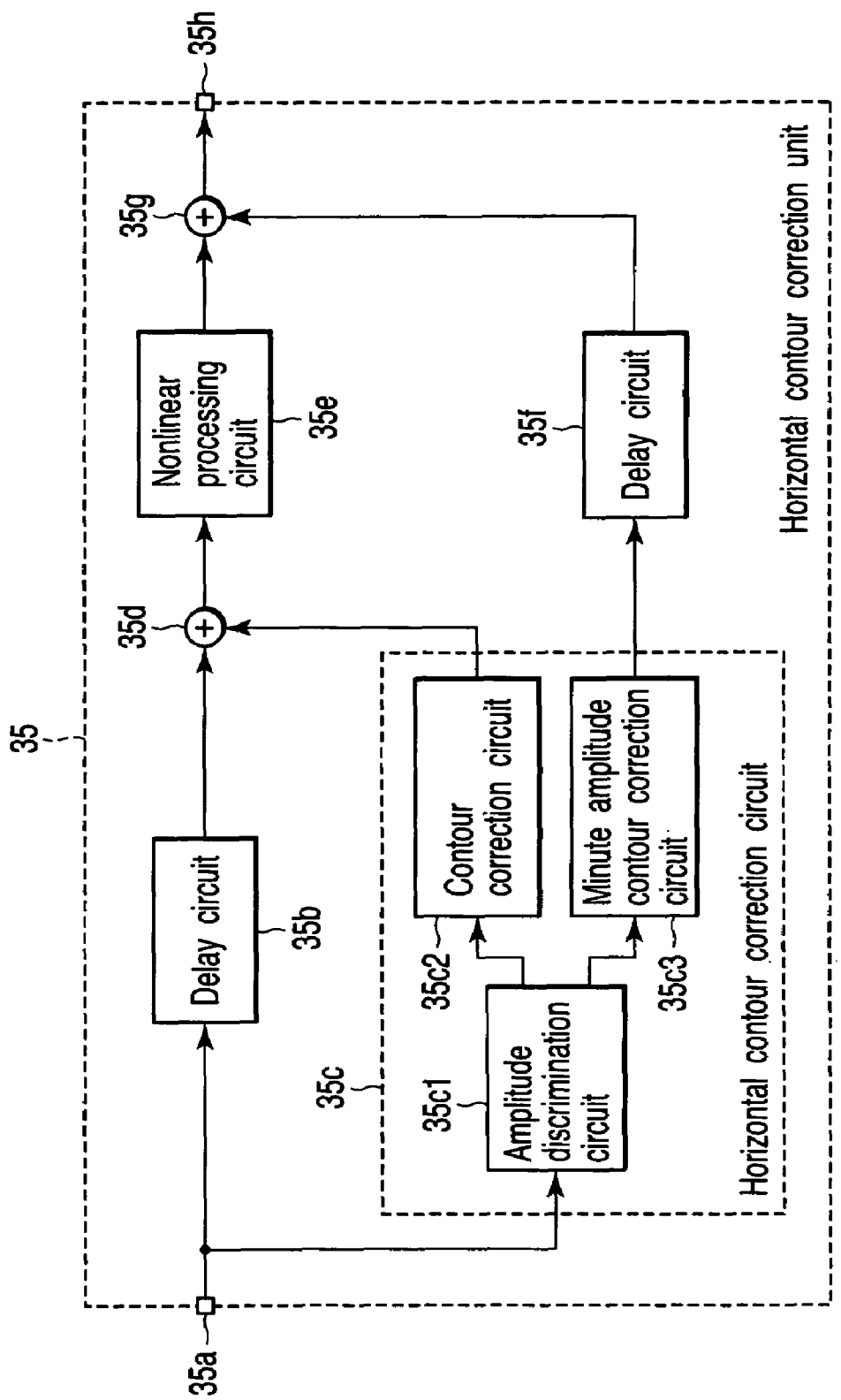
FIG. 5 is a block diagram for explaining the details of a horizontal contour correction unit used for a video processing unit of the TV receiving apparatus in the embodiment.

FIG. 5 shows a horizontal contour correction unit 35 disposed inside the video processing unit 27. A digitalized brightness signal is supplied to the correction unit 35 via an input terminal 35a, as a video signal output from a scaling unit 26. The brightness signal supplied to the input terminal 35a is supplied to a delay circuit 35b and an amplitude discrimination circuit composing a horizontal contour correction circuit 35c1.

The discrimination circuit 35c1 separates the contour component of the input brightness signal into a signal component with a minute amplitude level and other than a signal component with a high amplitude level. The separated signal component with the high amplitude level is supplied to a contour correction circuit 35c2, configured to have effect for the signal with the high amplitude level, where contour correction processing such as contour enhancing is processed on the signal component.

The delay circuit 35b delays the input brightness signal by the time required to the contour correction processing by the correction circuit 35c2. The brightness signal delayed by the delay circuit 35b and the brightness signal processed the contour correction processing are supplied to an adder circuit 35d to be added with each other.

After this, the brightness signal output from the adder circuit 35d is supplied to a nonlinear processing circuit 35e and is processed by nonlinear processing, for example, gamma correction.

At the same time, the signal component with the minute amplitude level separated by the amplitude discrimination circuit 35c1 is supplied to a minute amplitude contour correction circuit 35c3, designed to have effect for the signal with the minute amplitude level, where contour correction processing such as contour enhancing is processed on the signal component. Then, the processed signal component is supplied to a delay circuit 35f.

The delay circuit 35f delays the input brightness signal by the time required for the nonlinear processing by the nonlinear processing circuit 35e. An adder circuit 35g adds the brightness signal delayed through the delay circuit 35f to the brightness signal processed by the nonlinear processing through the nonlinear processing circuit 35e thereto, and an output terminal 35h outputs the added brightness signal.

The above-mentioned horizontal contour correction unit 35 separates the input brightness signal into the signal component with the high amplitude level and the signal component with the minute amplitude level. The correction unit 35 performs the nonlinear processing after performing the contour correction processing for the signal component with the high amplitude level, and performs only the contour correction processing for the signal component with the minute amplitude level.

That is, the correction unit 35 does not perform the nonlinear processing after performing the contour correction processing on the signal component with the minute amplitude level, so that the minute amplitude level component of the brightness signal is prevented from being compressed by the nonlinear processing and the delicacy of the pattern of the displayed video can be prevented from being impaired.

Figure 6:
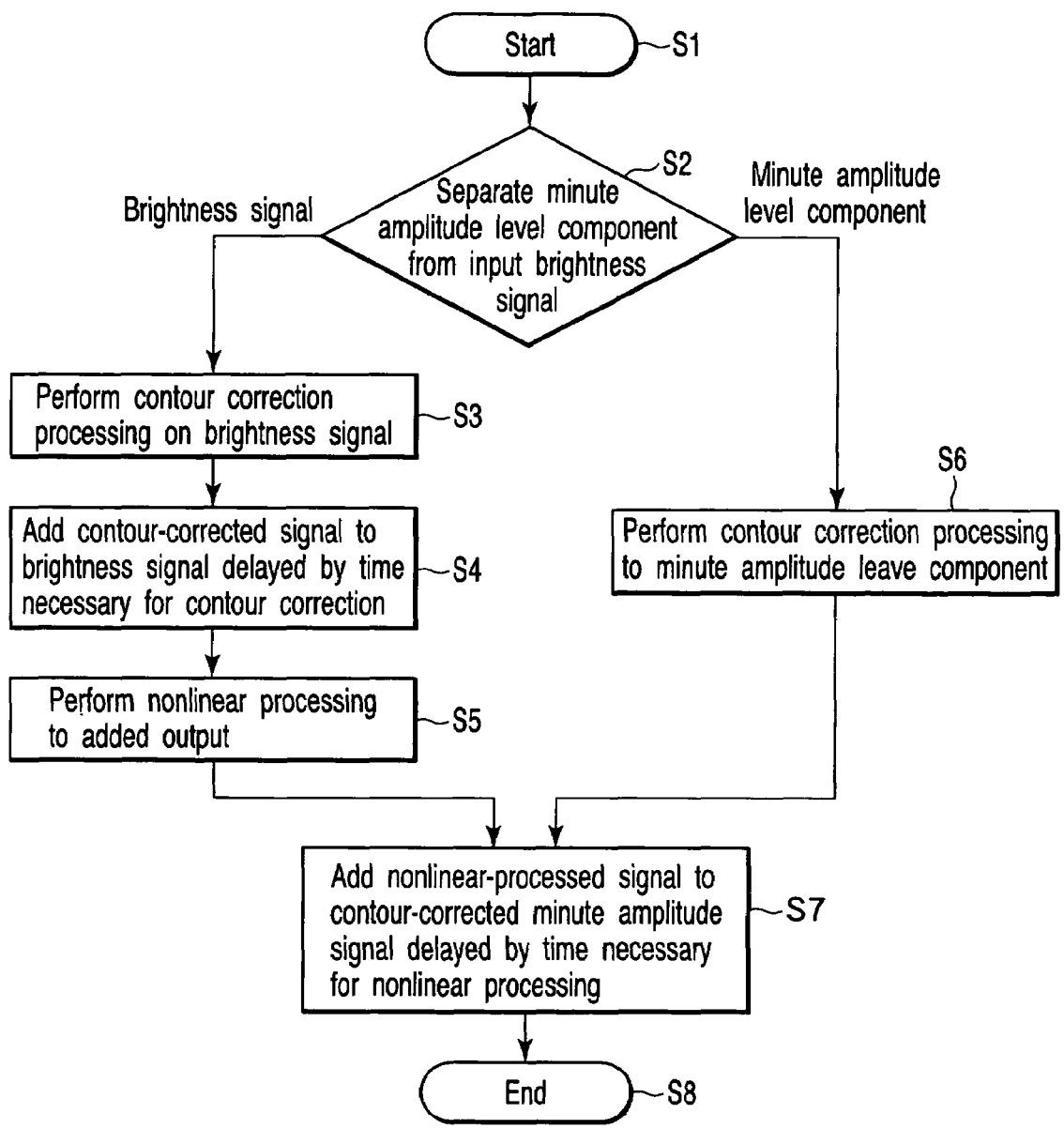
FIG. 6 is a flowchart for explaining main operations of a horizontal contour correction unit of the TV receiving apparatus in the embodiment.

FIG. 6 shows the flowchart as a whole of operations of the correction unit 35. After starting the processing (step S1), the amplitude discrimination circuit 35c1 separates the input brightness signal into the signal component with the minute amplitude level and other signal component with the high amplitude level (step S2).

The contour correction circuit 35c2 performs the contour correction processing such as contour enhancing on the signal component with the high amplitude level (step S3), and the adder circuit 35d adds the output from the contour correction circuit 35c2 to the output from the delay circuit 35b to delay the input brightness signal by the time necessary for the contour correction processing by the correction circuit 35c2 (step S4). After this, the nonlinear processing circuit 35e performs the nonlinear processing on the output from the adder circuit 35d (step S5).

The minute amplitude contour correction circuit 35c3 performs the contour correction processing such as contour enhancing on the signal component with the minute amplitude level (step 6). The adder circuit 35g adds the output from the nonlinear processing circuit 35e to the output from the delay circuit 35f to delay the output from the contour correction circuit 35c3 by the time needed for the nonlinear processing carried out by the nonlinear processing circuit 35e, then, the processing is terminated (step S8).

Though the embodiment stated above is an example adopted for the TV receiving apparatus 11, the invention is not limited to such an example, and it is possible to be adopted to, for example, an STB or a PDA.

Figure 7:
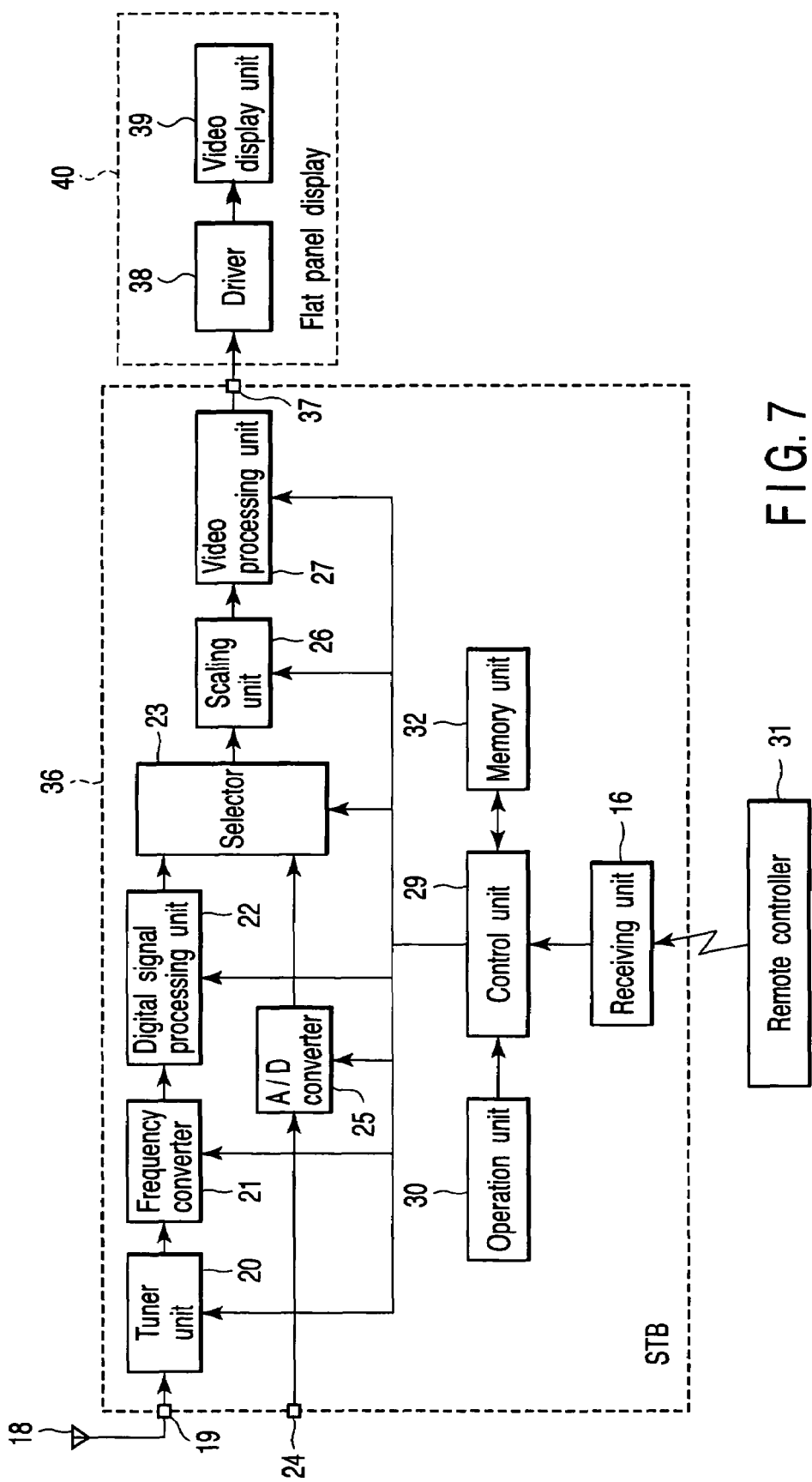
FIG. 7 is a block diagram for explaining an example of a set top box (STB) with the invention adopted thereto.

FIG. 7 shows a block diagram of an STB 36. The STB 36 will be explained by referring to the same symbols for the same parts as those of FIG. 3. The video signal generated from the video processing unit 27 can be output through an output terminal 37. A flat panel display 40 equipped with a driver 38 and a video display unit 39 displays the video signal output through the output terminal 37, as the video display.

Figure 8:
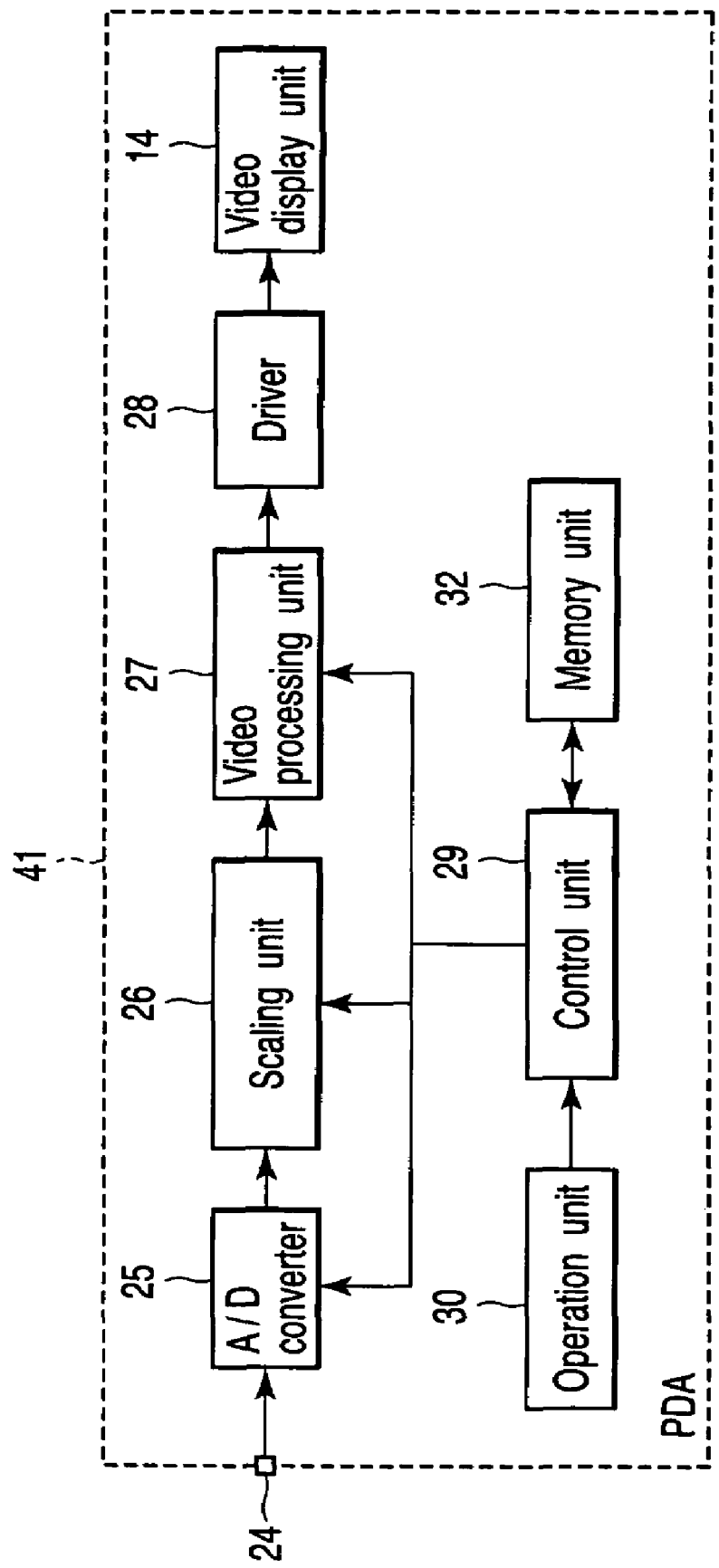
FIG. 8 is a block diagram for explaining an example of a personal digital assistant (PDA).

FIG. 8 shows a PDA 41. The PDA 41 will be explained by referring to the same symbols for the same parts as those of FIG. 3. The PDA 41 becomes a mobile information terminal which is not provided with the antenna 18, the input terminal 19, the tuner unit 20, the frequency converter 21, the digital signal processing unit 22, the selector 23, the receiving unit 16, and the like.

It is possible for the video processing unit 27 of the STB 36 and the PDA 41 to be provided with the horizontal contour correction unit 35 shown in FIG. 5.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An apparatus for processing a video signal, comprising:
   a receiving unit which receives a broadcast signal;
   a recovery processing unit which recovers a video signal from the broadcast signal received by the receiving unit;
   a first contour correction unit which performs contour correction processing on the video signal recovered by the recovery processing unit;
   a first delay unit which delays the video signal recovered by the recovery processing unit by the time required for the contour correction processing performed by the first contour correction unit;
   a first adder unit which adds an output signal from the first delay unit to an output signal from the first contour correction unit;
   a nonlinear processing unit which performs nonlinear processing on an output signal from the first adder unit;
   a separation unit which separates a signal component with not more than a prescribed amplitude level from a contour component of the video signal recovered by the recovery processing unit;
   a second contour correction unit which performs contour correction processing on a signal with not more than the prescribed amplitude level separated by the separation unit;
   a second delay unit which delays an output signal from the second contour correction unit by the time required for the nonlinear processing performed by the nonlinear processing unit; and
   a second adder unit which adds an output signal from the second delay unit to an output signal from the nonlinear processing unit.

2. The apparatus for processing the video signal according to claim 1, further comprising a video display unit which makes a video display on the basis of an output signal from the second adder unit.

3. The apparatus for processing the video signal according to claim 1, further comprising an output unit which outputs an output signal from the second adder unit.

4. An apparatus for processing a video signal, comprising:
   a receiving unit which receives a video signal;
   a first contour correction unit which performs contour correction processing on the video signal received by the receiving unit;
   a first delay unit which delays the video signal received by the receiving unit by the time required for the contour correction processing performed by the first contour correction unit;
   a first adder unit which adds an output signal from the first delay unit to an output signal from the first contour correction unit;
   a nonlinear processing unit which performs nonlinear processing on an output signal from the first adder unit;
   a separation unit which separates a signal component not more than a prescribed amplitude level from the contour component of the video signal received by the receiving unit;
   a second contour correction unit which performs contour correction processing on a signal with not more than the prescribed amplitude level separated by the separation unit;
   a second delay unit which delays an output signal from the second contour correction unit by the time required for the nonlinear processing performed by the nonlinear processing unit; and
   a second adder unit which adds an output signal from the second delay unit to an output signal from the nonlinear processing unit.

5. The apparatus for processing the video signal according to claim 4, further comprising a video display unit which makes a video display on the basis of an output signal from the second adder unit.

6. The apparatus for processing the video signal according to claim 4, further comprising an output unit which outputs an output signal from the second adder unit.

7. The apparatus for processing the video signal according to any one of claims 1-6, wherein the separation unit separates a signal component with a minute amplitude level from the contour component of the video signal.

8. A method for processing a video signal, comprising:
   a first step of receiving a video signal;
   a second step of performing contour correction processing to the video signal;
   a third step of delaying the video signal by the time required for the contour correction processing in the second step;
   a fourth step of adding an output signal from the third step and an output signal from the second step;
   a fifth step of performing nonlinear processing on an output signal from the fourth step;
   a sixth step of separating a signal component with not more than a prescribed amplitude level from a contour component of the video signal;
   a seventh step of performing contour correction processing on a signal with not more than the prescribed amplitude level separated in the sixth step;
   an eighth step of delaying an output signal from the seventh step by the time required for the nonlinear processing in the fifth step; and
   a ninth step of adding an output signal from the eighth step to the output signal from the seventh step.

9. The method for processing a video signal according to claim 8, further comprising a tenth step of making a video display on the basis of an output signal from the ninth step.

10. The method for processing a video signal according to claim 8, further comprising a tenth step of outputting an output signal from the ninth step.

11. The method for processing a video signal according to claim 8, wherein the first step comprises:
    receiving a broadcast signal including a video signal, instead of receiving the video signal;
    recovering the video signal from the received broadcast signal; and
    passing the recovered video signal to the second step for the contour correction processing.

12. The method for processing a video signal according to claim 11, further comprising a tenth step of making a video display on the basis of an output signal from the ninth step.

13. The method for processing a video signal according to claim 11, further comprising a tenth step of outputting an output signal from the ninth step.

14. The method for processing the video signal according to any one of claims 8-13, wherein the step of separating the signal component with not more than the prescribed amplitude level from the contour component of the video signal is a step of separating a signal component with a minute amplitude level from the contour component of the video signal.

* * * * *